US012798183B2

(12) United States Patent
Aceves Verdin et al.

(10) Patent No.: US 12,798,183 B2
(45) Date of Patent: Nov. 17, 2026

(54) PRINTED FILAMENT REMOVAL

(71) Applicant: INTERNATIONAL BUSINESS MACHINES CORPORATION, Armonk, NY (US)

(72) Inventors: Roberto Aceves Verdin, Zapopan (MX); Mirka Arlette Anchondo Commesse, Tlajomulco de Zuniga (MX); Enrique Alanis Valle, Tlaquepaque (MX); Jeremy Ray Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 18/811,269

(22) Filed: Aug. 21, 2024

(65) Prior Publication Data

US 2026/0054450 A1 Feb. 26, 2026

(51) Int. Cl.

| | |
|---|---|
| ***B29C 64/194*** | (2017.01) |
| ***B29C 64/209*** | (2017.01) |
| ***B29C 64/393*** | (2017.01) |
| ***B29K 67/00*** | (2006.01) |
| ***B33Y 10/00*** | (2015.01) |
| ***B33Y 30/00*** | (2015.01) |

(Continued)

(52) U.S. Cl.

CPC .......... *B29C 64/194* (2017.08); *B29C 64/209* (2017.08); *B29C 64/393* (2017.08); *B33Y 10/00* (2014.12); *B33Y 30/00* (2014.12); *B33Y 40/00* (2014.12); *B33Y 50/02* (2014.12); *B29K 2067/003* (2013.01)

(58) Field of Classification Search

CPC .... B29C 2045/0077; B29C 2045/0058; B29C 44/1252; B29C 64/393; B29C 64/20; B29C 64/194; B29C 64/10; B29C 64/147; B29C 64/153; B29C 64/165; B29C 64/171; B29C 64/188; B29C 64/209; B29C 64/214; B29C 2037/903; B29C 2037/90; B29C 2043/585

See application file for complete search history.

(56) References Cited

U.S. PATENT DOCUMENTS 5,902,537 A * 5/1999 Almquist ................ B29C 41/12 264/401
9,630,364 B2 4/2017 Ho et al.
9,688,020 B2 6/2017 Teken et al.

(Continued)

FOREIGN PATENT DOCUMENTS

CN 105034366 A 11/2015
CN 114905744 A 8/2022
CN 219055370 U 5/2023

OTHER PUBLICATIONS

"Is 3D Printing Wasteful? The Facts Explained", Retrieved from: https://web.archive.org/web/20220623070815/https://printingit3d.com/is-3d-printing-wasteful-the-facts-explained/, Jun. 23, 2022, 8 pages.

(Continued)

*Primary Examiner* — Stella K Yi
(74) *Attorney, Agent, or Firm* — CHIP LAW GROUP

(57) ABSTRACT

Three-dimensional print systems and methods for removing a filament include detecting a defect in a print-in-progress based on a comparison between the print-in-progress and 3D design. A top layer of the print-in-progress using a print head. The top layer of the print-in-progress is removed using a blade attached to the print head.

10 Claims, 3 Drawing Sheets

(51) Int. Cl.
*B33Y 40/00* (2020.01)
*B33Y 50/02* (2015.01)

(56) References Cited

U.S. PATENT DOCUMENTS

| | | | | |
|---|---|---|---|---|
| 10,232,566 | B2 | 3/2019 | Zheng et al. | |
| 10,953,647 | B2 | 3/2021 | Hardee et al. | |
| 2014/0328963 | A1* | 11/2014 | Mark | B33Y 50/02 425/143 |
| 2016/0325498 | A1* | 11/2016 | Gelbart | B33Y 30/00 |
| 2018/0194075 | A1* | 7/2018 | Hardee | B33Y 10/00 |
| 2020/0307101 | A1 | 10/2020 | Schultz et al. | |
| 2024/0300183 | A1 | 9/2024 | Suto et al. | |

OTHER PUBLICATIONS

“Shifting Transport Paradigms”, Retrieved from: https://www.ibm.com/thought-leadership/institute-business-value/en-us/report/3d-printing, 2014, 16 pages.

“Start Thinking About Simulations”, Retrieved from: https://web.archive.org/web/20230411005218/http://unrealdata.ai/, Apr. 11, 2023, 6 pages.

* cited by examiner

PRINTED FILAMENT REMOVAL

BACKGROUND

The present invention generally relates to three-dimensional (3D) printing and, more particularly, to correcting errors in a printed object.

3D printing is a technique whereby computer-designed shapes can be rendered with extrudable materials. For example, a 3D printer may have a movable head that melts plastic or otherwise extrudes a material in a predetermined pattern, building up the shape layer-by-layer. 3D printing can be used to create shapes that would be difficult or impossible to make by conventional methods.

However, the printing process can be susceptible to environmental and mechanical variations. For example, under-extrusion, over-extrusion, oozing, and calibration errors can cause print failures, where the printed object does not accurately reflect the design that was used to make it. When this happens, the printed object may be unusable, leading to wasted time and materials.

SUMMARY

A method for removing filament includes detecting a defect in a print-in-progress based on a comparison between the print-in-progress and 3D design. A top layer of the print-in-progress using a print head. The top layer of the print-in-progress is removed using a blade attached to the print head.

A computer program product includes one or more computer-readable storage media and program instructions stored on the one or more storage media. The program instructions perform operations that include detecting a defect in a print-in-progress based on a comparison between the print-in-progress and a 3D design, melting a top layer of the print-in-progress using a print head, and removing the top layer of the print-in-progress using a blade attached to the print head.

A 3D print system includes a processor set, a print head, a blade attached to the print head, one or more computer-readable storage media, and program instructions stored on the one or more storage media. The program instructions cause the processor set to perform operations that include detecting a defect in a print-in-progress based on a comparison between the print-in-progress and a 3D design, melting a top layer of the print-in-progress using the print head, and removing the top layer of the print-in-progress using the blade.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The yield of three-dimensional (3D) and four-dimensional (4D) printing processes may be improved by correcting printing errors before the print is completed. When a flaw in the printed object is detect, for example by identifying separated layers or a point where the printed object otherwise does not conform to an expected design, layers that have already been printed may be re-melted and removed. The print may then resume from an earlier point in the process to finish the printed object.

To this end, imperfections in the printed structure may be detected using cameras that monitor the visual condition of the print-in-progress. When an imperfection is identified, a heated nozzle can be used to re-melt one layer of the print-in-progress at a time. A collection blade may be attached to the heated nozzle to help separate the melted material, which can then be removed using suction or any other appropriate mechanism. This material may be stored to allow later re-use.

Figure 1:
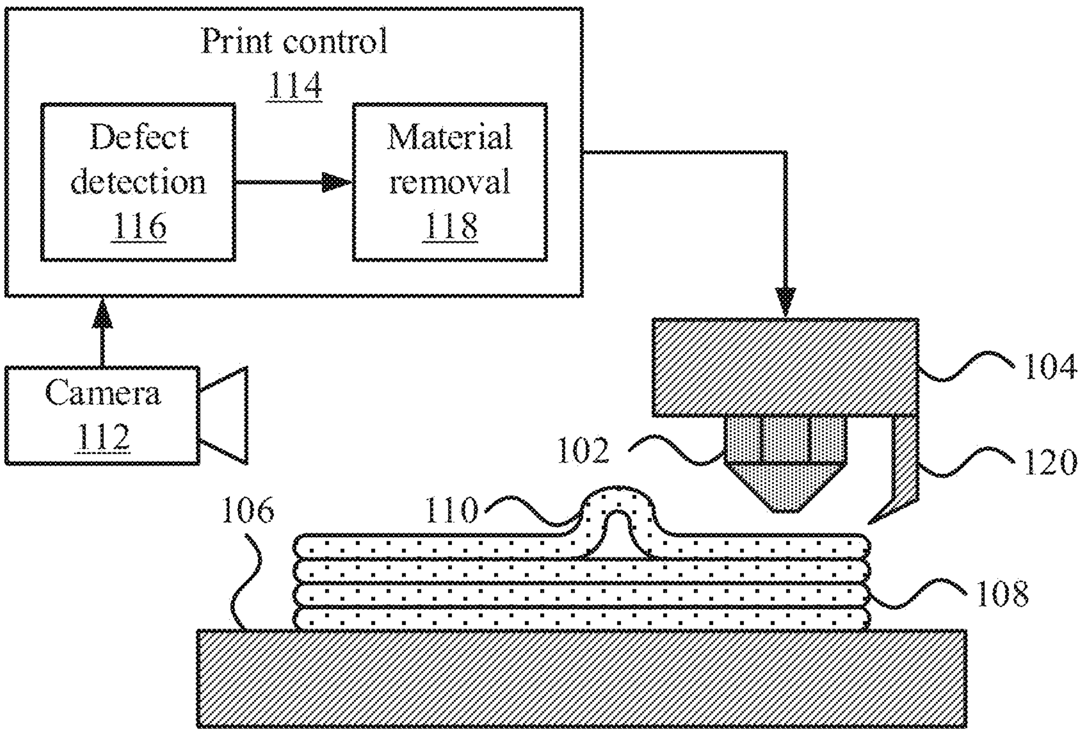
FIG. 1 is a diagram showing a three-dimensional (3D) print system that includes a blade mounted to the print head for removal of defectively printed material, in accordance with an embodiment of the present invention.

Referring now to FIG. 1, an exemplary 3D printing system is shown. A print head 102 is attached to a gantry 104 or other fixture that moves laterally over a print bed 106. As the print head moves, it extrudes a print material, which is deposited on the print bed 106. After a full layer is deposited, the gantry 104 moves the print head 102 vertically and a next layer is deposited on top of the previous layer. As multiple layers 108 are formed on top of one another, a 3D object is formed in accordance with an input design. In some embodiments, the layers 108 may be formed from polyethylene terephthalate glycol (PETG), a thermoplastic, but it should be understood that other materials may be used instead. This view of a 3D printing system is intended to be purely exemplary and should not be regarded as limiting—other types of 3D printing are contemplated and fall within the scope of the present principles.

During printing of a layer, an error may occur that creates a layer 110 with imperfections. For example, too much or too little material may be deposited, causing the material to buckle or to leave a gap. In some cases, the new layer may fail to adhere, or may cause adhesion of a previous layer to break, leaving a gap in what should be a continuous wall. Poor cohesion between layers can result from a variety of factors. Causes may include inadequate adhesion between the first layer and the print bed 106. If the initial layer does not adhere well, subsequent layers may not be bound effectively, leading to weak inter-layer cohesion. Factors that affect bed adhesion include bed leveling, surface preparation, and temperature settings.

Print temperature may also affect cohesion. For example, each printing material has a range of effective extrusion temperatures. If the print temperature is below this range, the material may not melt sufficiently, resulting in poor cohesion between layers. Print temperatures that are above the effective range may cause over-melting, which can also impair cohesion. Low-quality or impure printing material may include contaminants or inconsistencies that affect layer bonding.

Cooling fans may be used to quickly cool down the previous layer 108 before the next layer 110 is printed. If the cooling fan operates too aggressively, the previous layer 108 may cool too much, resulting in poor cohesion with the next layer 110. Environmental factors, such as temperature and humidity, can also affect layer cohesion.

High print speeds and rapid acceleration can introduce mechanical stresses and vibration that hinder layer-to-layer bonding. Layer height and nozzle size can similarly cause mechanical defects, as thicker layers may not bond properly. The orientation of the object on the print bed 106 and the use of support structures can also affect adhesion.

During the printing process, cameras 112 may monitor the print-in-progress. There may be multiple cameras 112 that view the print-in-progress from different angles. The images from the cameras 112 are sent to a print control 114 which controls the gantry 104 and the print head 102. Defect detection 116 identifies discrepancies between the printed layers 108/110 and the design. A detected defect 116 may trigger automatic material removal 118, or may present an alert to a user who may then manually trigger the material removal 118.

During material removal, a removal tool 120 is used to remove material from the defective layer 110. The nozzle of the print head 102 may be heated to a temperature that is appropriate to melt the defective layer 110 and may be moved near to, or in contact with, the defective layer 110. The heated print head 102 may then be moved across the defective layer 110, with the removal tool 120 in contact with the material. As the heated print head 102 melts the defective layer 110, the removal tool physically removes it from the underlying layers 108 and stores it for later disposal or re-use. This process may be repeated multiple times to remove the entirety of the defective layer 110. If there are multiple defective layers 110, some or all may be removed. In some cases, at least one of the previously deposited layers 108 may be removed as well.

Figure 2:
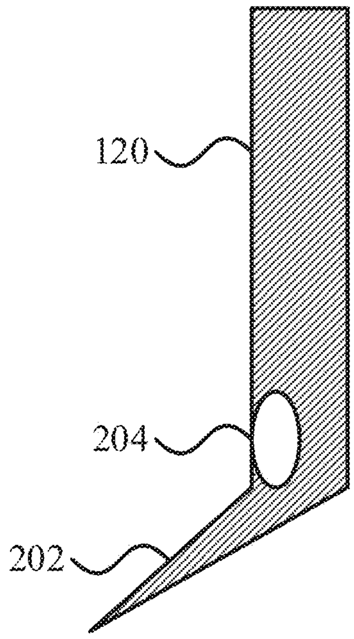
FIG. 2 is a diagram of a blade that can be used to remove defectively printed material, in accordance with an embodiment of the present invention.

Referring now to FIG. 2, additional detail on the removal tool 120 is shown. The removal tool 120 may include a blade 202 or other tip that is used to scrape at the melted material of the defective layer 110 and to separate that material from the underlying layers 108. An opening 204 provides suction that may be used to remove the melted material. In some cases, the opening 204 may be integral with the structure of the blade 202, and in other cases the opening 204 may be a hose. The opening 204 may lead to a separate container for storage of the removed material. A hose or other channel between the opening 204 and the container may include heating elements to prevent the removed material from solidifying before it reaches the container.

The blade 202 may be positioned in such a way that it only makes contact with the printed material during the removal process. For example, the tip of the blade 202 may be positioned somewhat lower than a bottom surface of the print head 102, and may be positioned so that it precedes the print head 102 as it moves during printing. The tip of the blade 202 may therefore be at a height above a top surface of the underlying layers 108. During material removal, the height of the top of the blade 202 may be below a top surface of the defective layer 110. The print head 102 may then move in an opposite direction as during printing, so that it passes over the defective layer 110 first and applies heat to melt the material. The blade 202 follows the print head 102 during removal, and its lower tip makes contact with the melted material.

The removal tool 120 may be connected to the gantry 104 by an adjustable clamp or motorized mount that allows the vertical position of the blade 202 to be changed relative to the print head 102. The blade 202 may be removable and replaceable.

Figure 3:
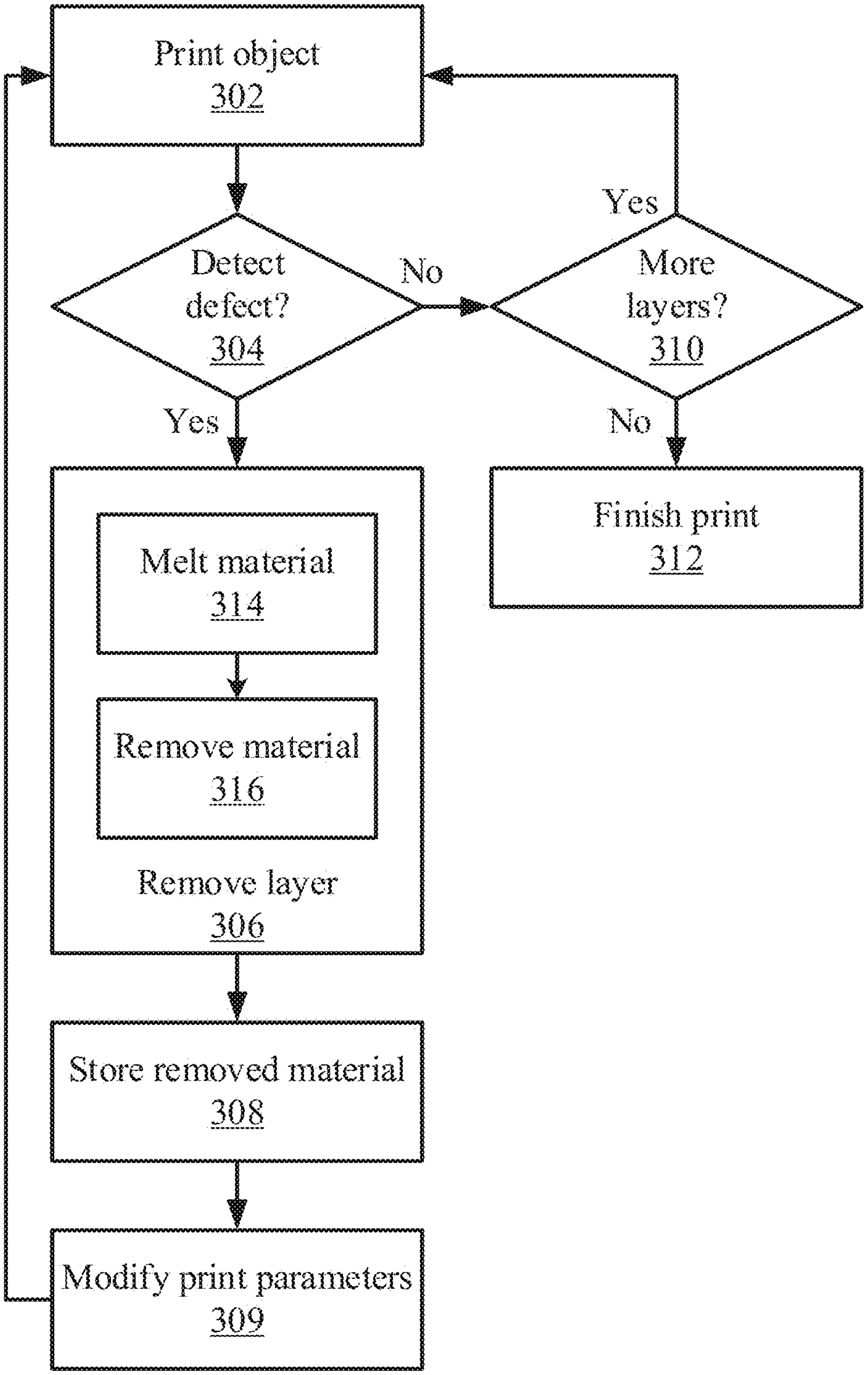
FIG. 3 is a block/flow diagram of a method for detecting and correcting defects in a 3D print, in accordance with an embodiment of the present invention.

Referring now to FIG. 3, a method of correcting a print defect is shown. Block 302 begins printing an object in accordance with a predetermined 3D design. The design may be stored in any format that is appropriate to the 3D print system. The print may be conducted using any appropriate printing technology, such as fused filament fabrication whereby a continuous filament of plastic material is deposited layer-by-layer.

During printing, cameras 112 are used to monitor the physical dimensions of the printed object. Block 304 determines whether a defect has occurred. Detection of the defect may include the creation of a 3D scan of the object being printed and comparison of the 3D scan to the 3D design. Differences between the 3D scan and the 3D design may be measured. If the differences exceed a threshold amount, then block 304 may indicate a defect. For example, the comparison may show that a most recent layer is rotated relative to the design's orientation by some above-threshold amount. In some cases, visual inspection by a camera 112 may show objective defects that can be identified without reference to the 3D design. For example, there may be gaps between layers due to under-extrusion, or the model may bulge from over-extrusion of material. Stringing may also be detected visually, and may result from motion of the nozzle which is not intended to deposit material, but which may result in stretching a filament into a long, thin string.

When block 304 detects a defect, block 306 removes one or more layers of the print-in-progress. This removal 306 includes melting material in block 314 and removal of the melted material in block 316, for example using removal tool 120. Block 308 optionally stores the removed material for later re-use. Having removed the defective layer 110, processing may return to block 302 and the print may be resumed from the previous layers 108. The print head 102 may be allowed to return to a normal temperature for printing before the print is resumed at block 302.

When the print is resumed, print parameters may be changed in block 309 to prevent the defect from reoccurring. For example, in the case of under-extrusion or over-extrusion, an extrusion multiplier parameter may be adjusted to ensure that the correct amount of material is deposited. A defect related to splitting between layers may be addressed by adjusting nozzle alignment. A defect relating to stringing may be addressed by adjusting retraction speed and distance, as well as nozzle temperature. Surface imperfections may be addressed by adjusting coasting and retraction parameters.

In some embodiments, the removal 306 of material may proceed for the defective layer 110 and a predetermined number of the previous layers 108. In some embodiments, a number of previous layers 108 to remove may be determined automatically based on the nature and severity of the defect, with more severe defects prompting the removal of more of the previous layers 108.

In some cases, triggering the removal 306 may be performed by an operator. In such embodiments, block 304 may output an alert to the operator upon detection of the defect, giving the operator information about the defect and prompting the operator for a decision on whether to remove the most recent layer(s). The operator may select a number of layers to remove and may decide whether to proceed with removal 306 or to resume the print at block 302. In some embodiments a severity of the defect may be quantified and compared to a second threshold to determine whether to prompt the operator or to automatically proceed with the removal 306.

If no defect is detected at block 304, then block 310 determines whether there are more layers to print. If so, processing returns to block 302 and a next layer is printed. If there are no further layers, block 312 finishes the print.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
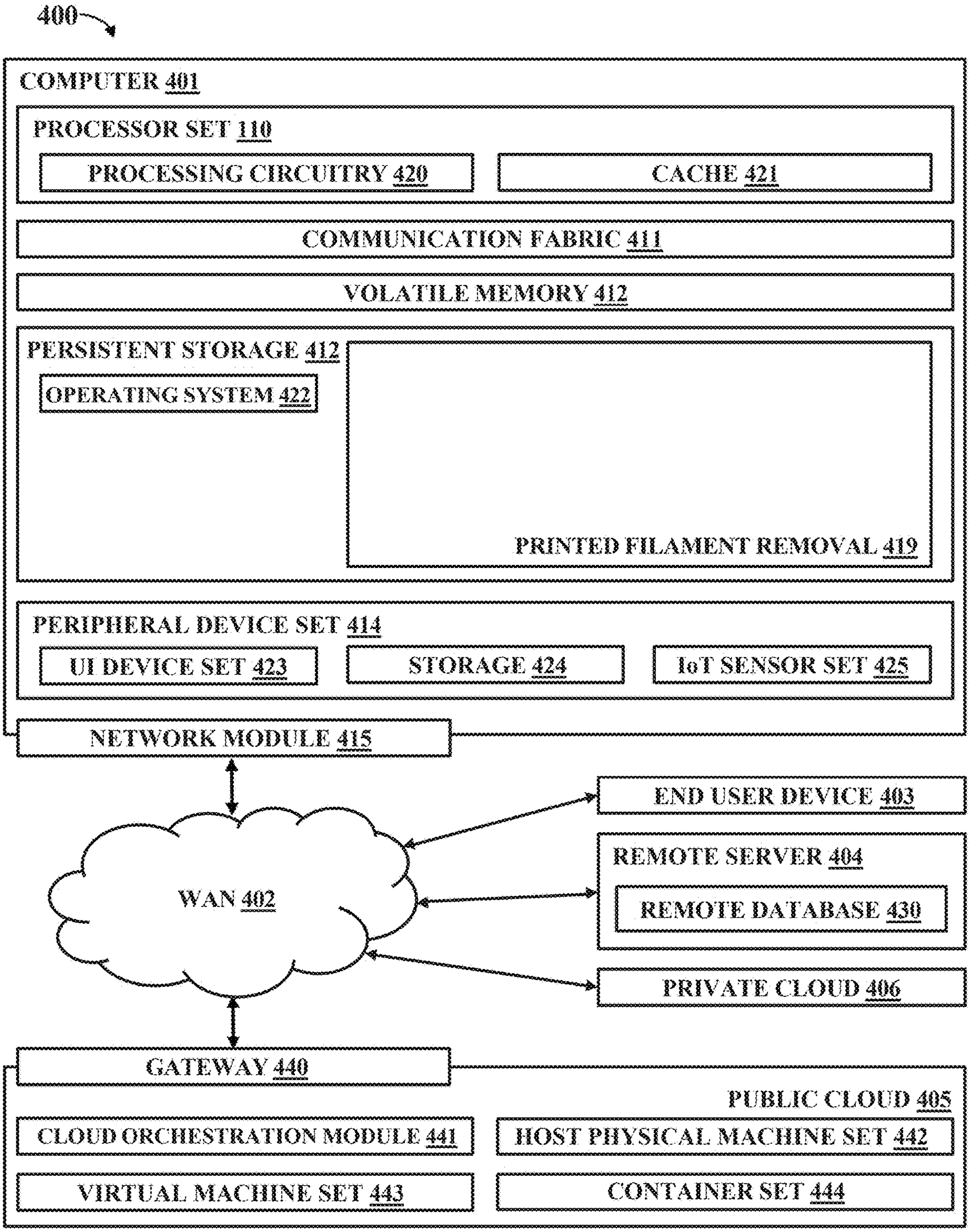
FIG. 4 is a block diagram of a computing environment that can perform printed filament removal, in accordance with an embodiment of the present invention.

Referring now to FIG. 4, a computing environment 400 is shown that contains an example of an environment for the execution of at least some of the computer code involved in performing the inventive methods, such as printed filament removal 419. In addition to block 419, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 419, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 419 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 412 is any type of volatile memory now known or to be developed in the future.

Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 419 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415. WAN 402 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402. Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of printed filament removal (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for removing filament, the computer-implemented method comprising:

detecting a defect in a print-in-progress based on a comparison between the print-in-progress and a three-dimensional (3D) design;

heating, based on the detecting of the defect, a nozzle of a print head associated with the print-in-progress to a first temperature;

melting, based on the heating of the nozzle of the print head to the first temperature, a top layer of the print-in-progress using the print head, wherein the first temperature corresponds to a melting temperature of the top layer of the print-in-progress;

removing, based on the melting, the top layer of the print-in-progress using a blade attached to the print head; and changing, based on the removing of the top layer, the first temperature of the nozzle of the print head associated with the print-in-progress to a second temperature, wherein the second temperature corresponds to a printing temperature.

2. The computer-implemented method of claim 1, further comprising resuming a print after the removing of the top layer by extruding the filament using the print head.

3. The computer-implemented method of claim 2, further comprising adjusting a print parameter associated with the print to prevent the defect from reoccurring, wherein the print parameter is adjusted before the resuming of the print.

4. The computer-implemented method of claim 2, wherein the blade has a tip at a height below a bottom of the print head.

5. The computer-implemented method of claim 2, further comprising cooling the nozzle of the print head before the resuming of the print.

6. The computer-implemented method of claim 1, further comprising collecting material of the removed top layer using suction at the blade.

7. The computer-implemented method of claim 6, further comprising storing the material of the removed top layer for re-use.

8. The method of claim 1, further comprising removing at least one additional layer of the print-in-progress after the removing of the top layer.

9. The computer-implemented method of claim 1, wherein the detecting of the defect includes:

quantifying a difference between the print-in-progress and a 3D design; and determining that the difference is greater than a predetermined threshold value.

10. The computer-implemented method of claim 1, wherein the removing of the top layer includes moving the print head in a direction opposite to a direction used to print the top layer such that the print head applies heat for the melting of the top layer prior to the blade makes contact with the top layer.

* * * * *